US011877600B2

(12) United States Patent
Liu et al.

(10) Patent No.: US 11,877,600 B2
(45) Date of Patent: Jan. 23, 2024

(54) ATOMIZER AND ELECTRONIC CIGARETTE THEREOF

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Hong Yu, Hunan (CN); Yuangang Dai, Hunan (CN); Xinqiang Yin, Hunan (CN); Jianhua Yi, Hunan (CN); Yang Wang, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 1069 days.

(21) Appl. No.: 16/500,696

(22) PCT Filed: Apr. 12, 2018

(86) PCT No.: PCT/CN2018/082735
§ 371 (c)(1),
(2) Date: Oct. 3, 2019

(87) PCT Pub. No.: WO2018/188616
PCT Pub. Date: Oct. 18, 2018

(65) Prior Publication Data
US 2020/0029624 A1 Jan. 30, 2020

(30) Foreign Application Priority Data

Apr. 13, 2017 (CN) .......................... 201720385211.0
Apr. 13, 2017 (CN) .......................... 201720385927.0

(51) Int. Cl.
A24F 40/465 (2020.01)
A24F 40/49 (2020.01)
(Continued)

(52) U.S. Cl.
CPC .............. *A24F 40/49* (2020.01); *A24F 40/05* (2020.01); *A24F 40/40* (2020.01); *A24F 40/485* (2020.01); *A24F 40/60* (2020.01); *A24F 40/10* (2020.01)

(58) Field of Classification Search
None
See application file for complete search history.

(56) References Cited

U.S. PATENT DOCUMENTS 7,392,809 B2 7/2008 Larson et al.
2012/0234821 A1 9/2012 Shimizu
(Continued)

FOREIGN PATENT DOCUMENTS

CN 203676146 U 7/2014
CN 204377939 U 6/2015
(Continued)

OTHER PUBLICATIONS

International Search Report issued in International Application No. PCT/CN2018/082735 dated Jun. 22, 2018, 5 pages.

*Primary Examiner* — James Harvey
(74) *Attorney, Agent, or Firm* — Mauriel Kapouytian Woods LLP; Ran Pang; Michael Mauriel

(57) ABSTRACT

An atomizer and an electronic cigarette with an atomizer are disclosed. The atomizer includes an atomizer body, in which the atomizer body includes a shell, a suction nozzle assembly mounted at the top of the shell, a liquid chamber and an atomization core disposed in the shell. An electronic cigarette with the atomizer is disclosed as well. The electronic cigarette can prevent liquid accumulation caused by long- (Continued)

time static placement and various misoperations. Furthermore, cigarette liquid does not leak during injection. The components of the atomizer such as the suction nozzle or the base do not need to be disassembled, so that the cigarette liquid is convenient to inject, and the user experience is good.

20 Claims, 7 Drawing Sheets

(51) Int. Cl.
*A24F 40/05* (2020.01)
*A24F 40/40* (2020.01)
*A24F 40/485* (2020.01)
*A24F 40/60* (2020.01)
*A24F 40/10* (2020.01)

(56) References Cited

U.S. PATENT DOCUMENTS

2019/0307173 A1* 10/2019 Qiu .......................... A24F 9/16
2020/0029624 A1* 1/2020 Liu ........................ A24F 40/05

FOREIGN PATENT DOCUMENTS

| CN | 205196998 U | 5/2016 | |
|---|---|---|---|
| CN | 205567822 U | 9/2016 | |
| CN | 205922900 U | 2/2017 | |
| CN | 205962837 U | 2/2017 | |
| CN | 206079024 U | 4/2017 | |
| CN | 206213285 U | 6/2017 | |
| CN | 206687167 U | 12/2017 | |
| CN | 206687170 U | 12/2017 | |
| WO | WO-2020083044 A1 * | 4/2020 | ............. A24F 40/40 |

* cited by examiner

ATOMIZER AND ELECTRONIC CIGARETTE THEREOF

CROSS REFERENCE TO RELATED APPLICATIONS

This application is a national phase application of international application number PCT/CN2018/082735 filed on Apr. 12, 2018, which claims priority to Chinese application number 201720385211.0 filed on Apr. 13, 2017 and Chinese application number 201720385927.0 filed on Apr. 13, 2017. The entire contents of these applications are hereby incorporated herein by reference.

FIELD OF THE INVENTION

The present invention relates to an atomizer and electronic cigarette thereof.

BACKGROUND OF THE INVENTION

In the existing ultrasonic high-frequency atomizing electronic cigarette, cigarette liquid in a liquid chamber is usually transferred to an atomization sheet through a liquid guide cotton, an air inlet channel and an air outlet channel are both communicated with an atomization surface of the atomization sheet, and the cigarette liquid is atomized by high-frequency oscillation.

The ignition key of the existing electronic cigarette is generally an on/off key arranged on a PCB, and a key cap is arranged above the on/off key. The key cap is pressed by a hand to squeeze the on/off key, and after the on/off key is deformed to a certain extent, the electronic cigarette is powered on to operate (the on/off key generally has a travel range of 0.20-0.35 mm).

However, the existing product has the following defects in practical application:

1. Cigarette liquid leakage easily occurred during injection, and components of the atomizer such as the suction nozzle or the base have to be disassembled before the injection, which is very troublesome and inconvenient.

2. Liquid accumulation is easy to occur on the surface of the atomization sheet. Especially when the electronic cigarette is not used for a long time, the cigarette liquid continually permeate downward, which easily causes liquid accumulation. As a result, the cigarette liquid is difficult to atomize, and little smoke is emitted.

3. Since the size of the electronic cigarette itself is confined, the space for setting the key is usually small, and the key is not easy to be pressed when the user operates.

4. The ignition key of the electronic cigarette has a short travel range, and the travel range and elastic force of deformation are only provided by switch, so the hand feeling of the key and the user experience are poor.

5. It does not have the function of a child lock and cannot prevent various misoperations.

SUMMARY OF THE INVENTION

In view of the above problems, the present invention is dedicated to provide an atomizer and an electronic cigarette which facilitate liquid injection, have no liquid t accumulation and can prevent misoperations.

The technical solution that solves the problems of the present invention is: an atomizer, including an atomizer body, wherein the atomizer body includes a shell, a suction nozzle assembly mounted at the top of the shell, a liquid chamber and an atomization core are disposed in the shell; the atomization core includes an atomization sheet, an atomization cotton capable of importing cigarette liquid from the liquid chamber into the atomization sheet is disposed in the shell; the shell is provided with an air inlet channel whose one end is communicated with the outside and the other end is communicated with an atomization surface of the atomization sheet, and an air outlet whose one end is communicated with the atomization surface of the atomization sheet and the other end is communicated with the suction nozzle assembly; an opening and closing device capable of controlling the cigarette liquid to flow into the atomization cotton and the air to flow into the air inlet channel simultaneously is disposed at a connection between the liquid chamber and the atomization cotton.

Specifically, the suction nozzle assembly includes a suction nozzle holder for sealing the top of the shell, and a nozzle fixedly connected to the suction nozzle holder;

the atomizer body further includes a connecting electrode mounted at the bottom of the shell, and the atomization sheet is electrically connected to the connecting electrode. The opening and closing device includes a hollow connecting sleeve fixedly connected to the suction nozzle holder, the air inlet channel includes first air inlets provided on the connecting sleeve, the suction nozzle holder is provided with air inlets as high as the first air inlets, the air inlets are aligned with and communication with the first air inlets, and a receiving cavity with an open bottom end is disposed at the lower part of the connecting sleeve;

the atomization core further includes a hollow liquid separation holder arranged at the bottom of the liquid chamber and sealing the liquid chamber, the atomization sheet is arranged in a lower cavity of the liquid separation holder, an inner sleeve is arranged at the upper part of the hollow cavity of the liquid separation holder, the atomization cotton is arranged between the outer wall of the inner sleeve and the inner wall of the liquid separation holder, and the atomization cotton abuts against the atomization surface of the atomization sheet;

a hollow air inlet tube is disposed in the inner cavity of the connecting sleeve, the air inlet tube is provided with second air inlets as high as the first air inlets, the lower end of the air inlet tube is fixedly connected to the inner sleeve, and air in the air inlet tube can be introduced to the atomization surface of the atomization sheet;

the upper part of the liquid separation holder is sleeved in a receiving cavity of the connecting sleeve, and the connecting sleeve is rotatable relative to the outer wall of the liquid separation holder; the connecting sleeve is provided with first liquid inlets corresponding to the bottom of the liquid chamber, the upper part of the liquid separation holder is provided with second liquid inlets as high as the first liquid inlets, and the side wall of the atomization cotton is closely attached to the second liquid inlets area;

the connection or disconnection state between the first air inlets and the second air inlets is synchronous with the connection or disconnection state between the first liquid inlets and the second liquid inlets;

the air outlet channel is communicated with the nozzle.

In the above solution, the suction nozzle holder is rotated to drive the connecting sleeve to rotate, the first air inlets on the connecting sleeve rotate about the fixed air inlet tube, and when the first air inlets are in aligned and communicated with the second air inlets, air is introduced; the first liquid inlets on the connecting sleeve rotate about the fixed liquid separation holder, and when the first liquid inlets are in aligned and communicated with the second liquid inlets, the cigarette liquid starts to introduce and permeates to the atomization cotton. When the first air inlets are in aligned and communicated with the second air inlets, the first liquid inlets are also in aligned and communicated with the second liquid inlets. When the first air inlets are disconnected from the second air inlets, the first liquid inlets are also disconnected from the second liquid inlets. Through this design, the electronic cigarette can be sucked by rotation, and when the electronic cigarette is not sucked, the air and liquid inlet channels are closed, thereby preventing juveniles from smoking on the one hand, and preventing liquid accumulation caused by long-time static placement on the other hand.

Further, the atomization cotton is of a hollow cylindrical structure, the air outlet channel includes an air outlet tube sleeved in the inner cavity of the air inlet tube, the lower end of the air outlet tube is extended into the hollow cavity of the atomization cotton, the upper end of the air outlet tube is extended to and connected to the inner cavity of the nozzle; a first gap is reserved between the inner wall of the air inlet tube and the outer wall of the air outlet tube, and the first gap is communicated with the second air inlets, which forms a first air inlet channel;

the lower end of the inner sleeve is provided with an open air guiding cavity which communicates with the hollow cavity of the atomization cotton, and the first air inlet channel communicates with the air guiding cavity.

The outside air sequentially enters the first air inlets, the second air inlets, the first air inlet channel, and the air guiding cavity from the air inlets, and finally reaches the bottom of the hollow cavity of the atomization cotton. The cigarette liquid in the liquid chamber is sequentially imported into the atomization cotton from the first liquid inlets and the second liquid inlets. The atomized smoke reaches the nozzle from the air outlet tube. Such an air inlet sequence can ensure that the smoke ultrasonically atomized is brought to the user's mouth more quickly and fully to meet the smoking demand of the user.

In order to make the contact between the atomization cotton and the atomization sheet more tight, the lower part of the air guiding cavity of the inner sleeve is sleeved with a first spring, the lower end of the first spring abuts against the inner surface of the bottom of the atomization cotton, and the air outlet tube penetrates through the inner sleeve and inserts into a center hole of the first spring.

Further, the suction nozzle holder is provided with a first liquid injection hole, the top of the shell is provided with a second liquid injection hole, and the second liquid injection hole is communicated with the liquid chamber;

a sealing gasket is arranged between the lower surface of the suction nozzle holder and the top of the shell, and a one-way valve that can be opened towards the liquid chamber is arranged at a position corresponding to the second liquid injection hole on the sealing gasket.

In the above solution, the second liquid injection hole is fixed, the first liquid injection hole is rotatable relative to the second liquid injection hole. When injecting liquid just make the first liquid injection hole and the second liquid injection hole aligned, and open the one-way valve to inject cigarette liquid into the liquid chamber.

Preferably, a plurality of first air inlets and first liquid inlets are uniformly distributed up-down and one-to-one correspondence about the connecting sleeve, and the connecting lines between the first air inlets and the corresponding first liquid inlets are parallel to the axis of the connecting sleeve.

Correspondingly, the present invention also provides an electronic cigarette including a power module, the power module including a housing;

the electronic cigarette further includes the above atomizer, the power module is electrically connected to the connecting electrode of the atomizer, and the housing is clamped to the shell through a connecting structure.

The connecting structure can be in multiple forms:

In a specific solution, the connecting structure includes a first bulge on the side wall of the shell, an elastic jaw on the housing, magnets arranged on the housing, and a magnetizable metal sheet arranged at the bottom of the shell;

the magnets are closely attached to the metal sheet, and the first bulge is engaged with the elastic jaw to fix the atomizer with the power module relatively.

In another specific solution, the connecting structure includes a strip slider on the side wall of the shell, chutes on the housing, a magnet arranged on the housing, and a magnetizable metal sheet arranged at the bottom of the shell;

the slider is inserted into the chutes for clamping, and the magnet is closely attached to the metal sheet to fix the atomizer with the power module relatively.

Further, a touch switch that controls on/off of a circuit is included;

a rotatable key is arranged on the side of the housing, and its rotating shaft is perpendicular to the housing; the key includes a rotating shaft portion and a pressing portion connected to the rotating shaft portion, the pressing portion can be engaged with or disengaged from the touch switch by rotation of the rotating shaft portion.

The switch key in the above form is larger than the conventional button, easier to operate, and can be set to have a longer travel range to enhance hand feel of the key and improve user experience.

In a preferred solution, the lower surface of the pressing portion is provided with a second bulge for pressing the touch switch, and the second bulge is located above the touch switch;

a second spring is arranged between the pressing portion and the touch switch, one end of the second spring is fixedly sleeved with the second bulge of the pressing portion, and the other end is fixedly connected to a housing of the touch switch.

The second spring is set to make the key to be automatically returned in a normal state. A battery holder is arranged in the housing, a battery is mounted in the battery holder, a main circuit board is mounted on one side of the battery holder, the touch switch is arranged at the top of the battery holder, and the touch switch is electrically connected to the main circuit board.

Further, the housing is provided with a kidney-shaped spacing hole facing the pressing portion, the second bulge of the pressing portion stretches into the spacing hole, and the length of the spacing hole is longer than the travel range of the pressing portion.

In another preferred solution, the rotating shaft portion is provided with a receiving cavity, an internal threaded sleeve and an external threaded sleeve are arranged as a rotating shaft in the center of the receiving cavity, internal threaded sleeve and the external threaded sleeve connect the rotating shaft portion with the housing, and the internal threaded sleeve and the external threaded sleeve form the rotating shaft of the rotating shaft portion after assembled;

the receiving cavity is provided with an arc groove on a side wall close to the housing, a positioning pin is arranged on the housing, and the positioning pin penetrates through the arc groove;

a stop pin is arranged in the receiving cavity, a torsion spring is sleeved at the rotating shaft, and a torsion arm of the torsion spring is clamped between the stop pin and the positioning pin.

When the key with the torsion spring is in the used state, the torsion spring is deformed to provide an upward elastic force to the pressing portion, which can enhance the elastic hand feel of the key.

A battery holder is arranged in the housing, a battery is mounted in the battery holder, and a main circuit board is mounted on one side of the battery holder;

a switch base is fixed in the receiving cavity, the switch base moves synchronously with the rotating shaft portion, the touch switch is arranged on a side of the switch base facing the housing, the touch switch is arranged to face the arc groove, and the positioning pin can be engaged with or disengaged from the touch switch;

the touch switch is electrically connected to the main circuit board.

Further, the pressing portion and the rotating shaft portion cross two sides of the housing, the key is provided with a notch at one end close to the rotating shaft portion, the atomizer and the top of the housing can pass through the notch. With such a design, the key has better strength and better symmetry in overall structure.

Further, a rotatable ejector rod is arranged on the housing below the pressing portion, the rotating shaft of the ejector rod is parallel to the rotating shaft of the rotating shaft portion, and the ejector rod can be engaged with or disengaged from the pressing portion.

When the electronic cigarette is in the unused state, the ejector rod is rotated to press against the pressing portion, which can effectively avoid misoperations caused by unintentional pressing of the pressing portion when the electronic cigarette is packaged or transported or not used.

The spacing hole is for protecting the pressing portion. The length of the spacing hole is just slightly longer than the travel range of the pressing portion, thereby preventing the touch switch or the pressing portion from being damaged due to excessive force.

The significant effects of the present invention are:

1. The rotatable suction nozzle assembly is designed to prevent juveniles from smoking and prevent liquid accumulation caused by long-time static placement.

2. Cigarette liquid does not leak during injection, the components of the atomizer such as the suction nozzle or the base do not need to be disassembled, and the cigarette liquid is convenient to inject.

3. The switch key is larger than the conventional button, easier to operate, and can be set to have a longer travel range to enhance hand feel of the key and improve user experience.

4. With the function of a child lock, when the electronic cigarette is not used, the ejector rod is rotated to press against the pressing portion, which can effectively avoid misoperations caused by unintentional pressing of the pressing portion when the electronic cigarette is packaged or transported or not used.

BRIEF DESCRIPTION OF THE DRAWINGS

The present invention will be further illustrated below in conjunction with the accompanying drawings.

In which: 1-shell, 2-connecting sleeve, 3-suction nozzle assembly, 4-liquid chamber, 5-atomization sheet, 6-connecting electrode, 7-atomization cotton, 8-first spring, 9-first air inlet channel, 10-liquid separation holder, 11-inner sleeve, 12-air inlet tube, 13-air outlet tube, 14-sealing gasket, 15-one-way valve, 16-power module, 17-first bulge, 18-strip slider, 19-chute, 21-first air inlet, 22-first liquid inlet, 31-suction nozzle holder, 32-nozzle, 101-second liquid inlet, 121-second air inlet, 161-housing, 162-elastic jaw, 163-magnet, 164-metal sheet, 202-key, 203-second bulge, 204-second spring, 205-battery holder, 206-battery, 207-main circuit board, 208-internal threaded sleeve, 209-external threaded sleeve, 311-air inlet, 312-first liquid injection hole, 313-second liquid injection hole, 2010-positioning pin, 2011-shell, 2012-touch switch, 2013-torsion spring, 2014-switch base, 2015-ejector rod, 2016-spacing hole, 2021-rotating shaft, 2022-rotating shaft portion, 2023-pressing portion, 2024-receiving cavity, 2025-arc groove, 2026-stop pin.

DETAILED DESCRIPTION OF EMBODIMENTS

Figure 1:
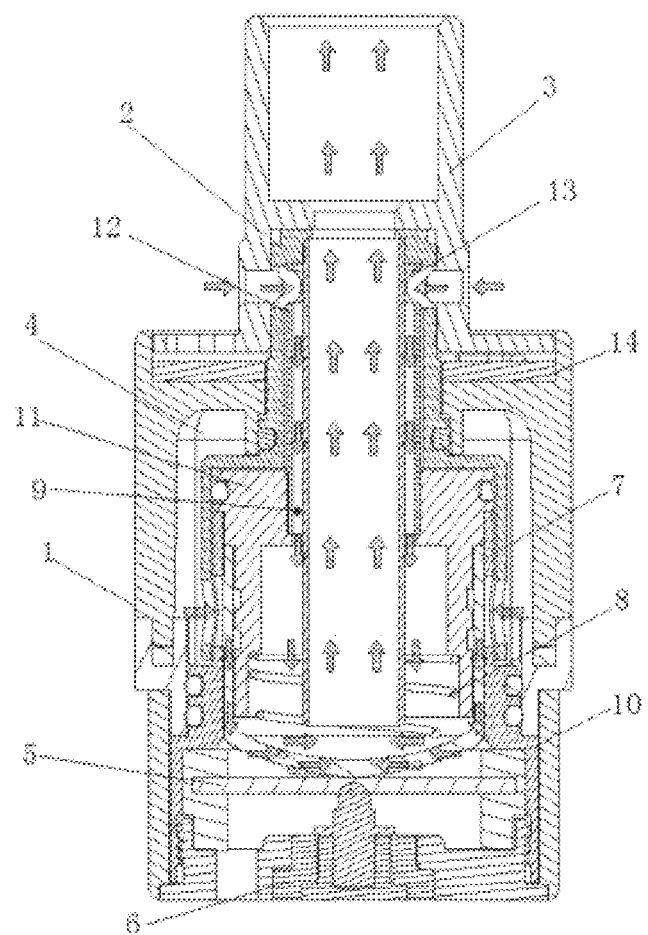
FIG. 1 is a sectional view of an atomizer in Embodiment 1.
Figure 2:
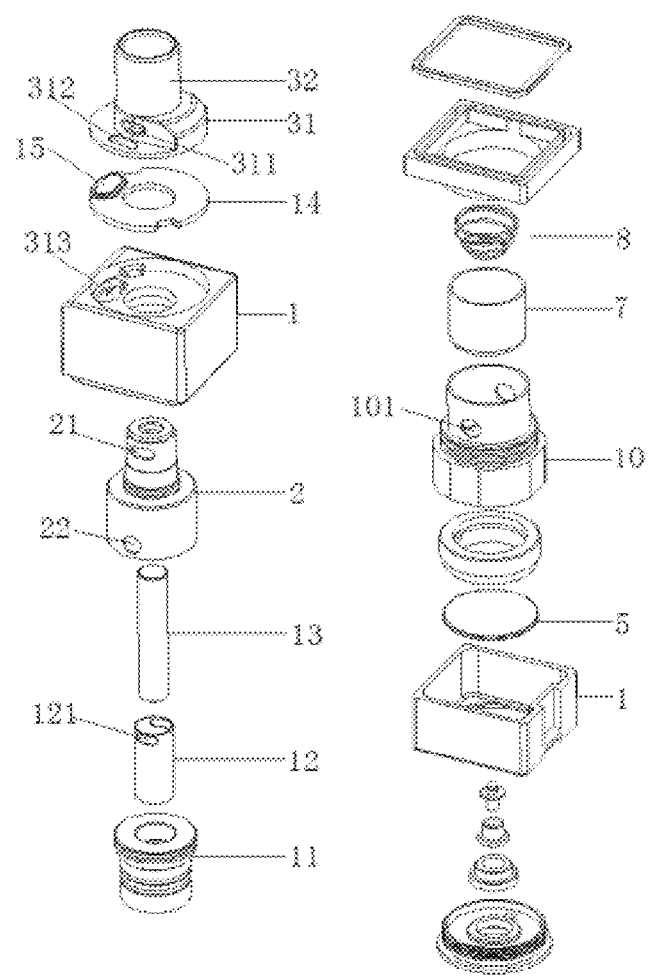
FIG. 2 is an exploded view of the atomizer in Embodiment 1.
Figure 3:
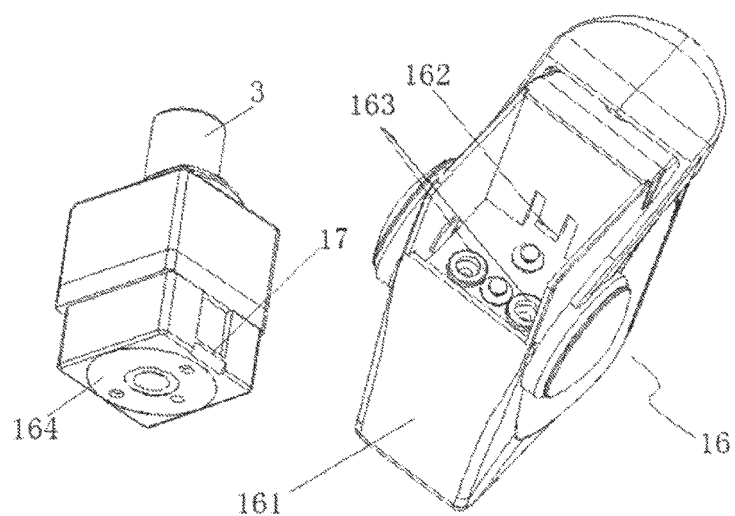
FIG. 3 is a structural exploded view of an electronic cigarette in Embodiment 1.
Figure 4:
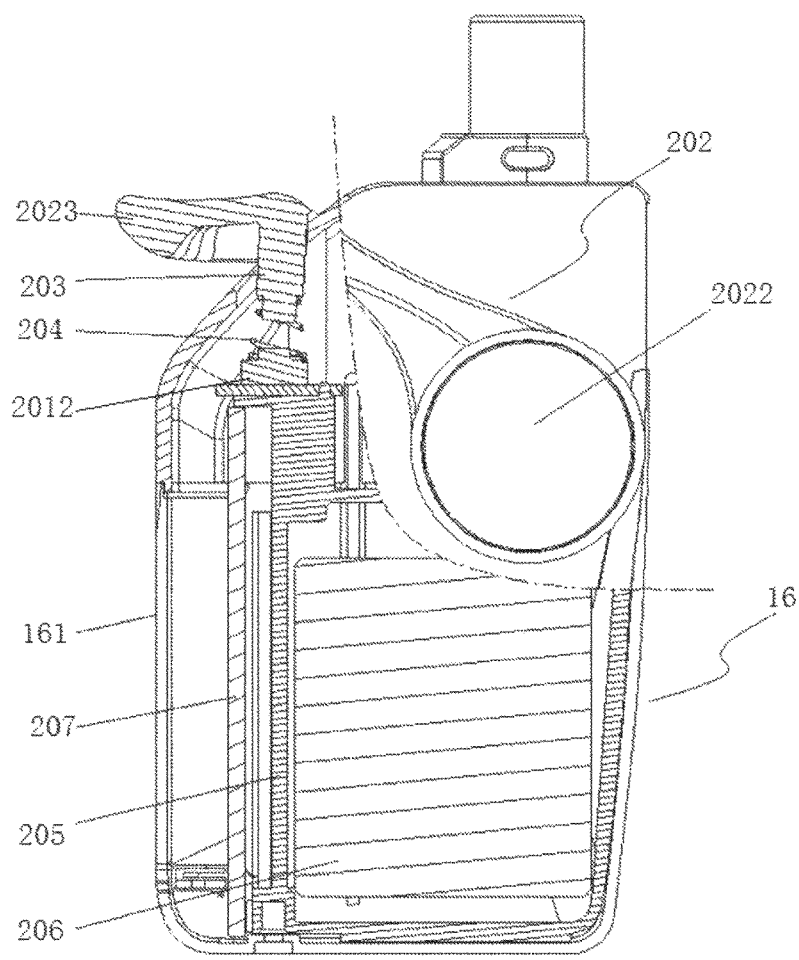
FIG. 4 is a partial sectional view of the electronic cigarette in Embodiment 1.
Figure 5:
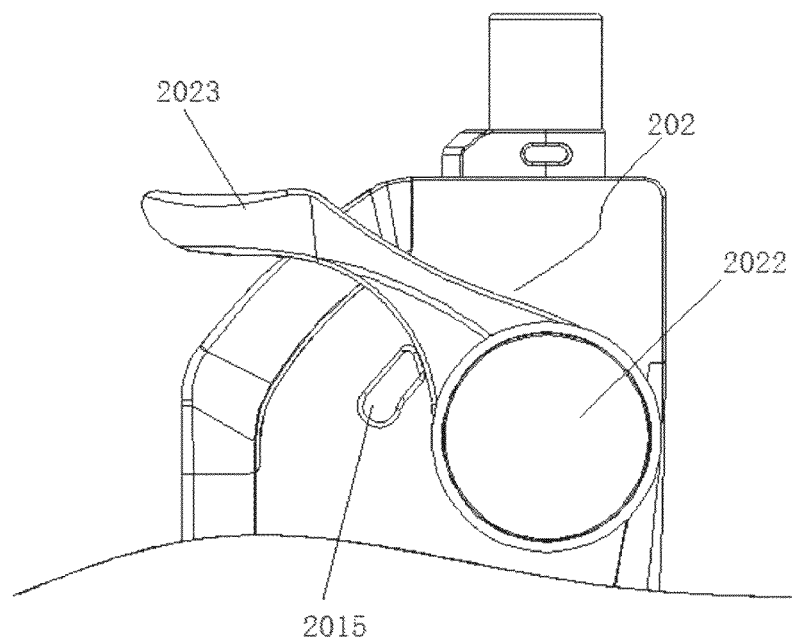
FIG. 5 is a partial schematic view of the electronic cigarette in Embodiment 1.
Figure 6:
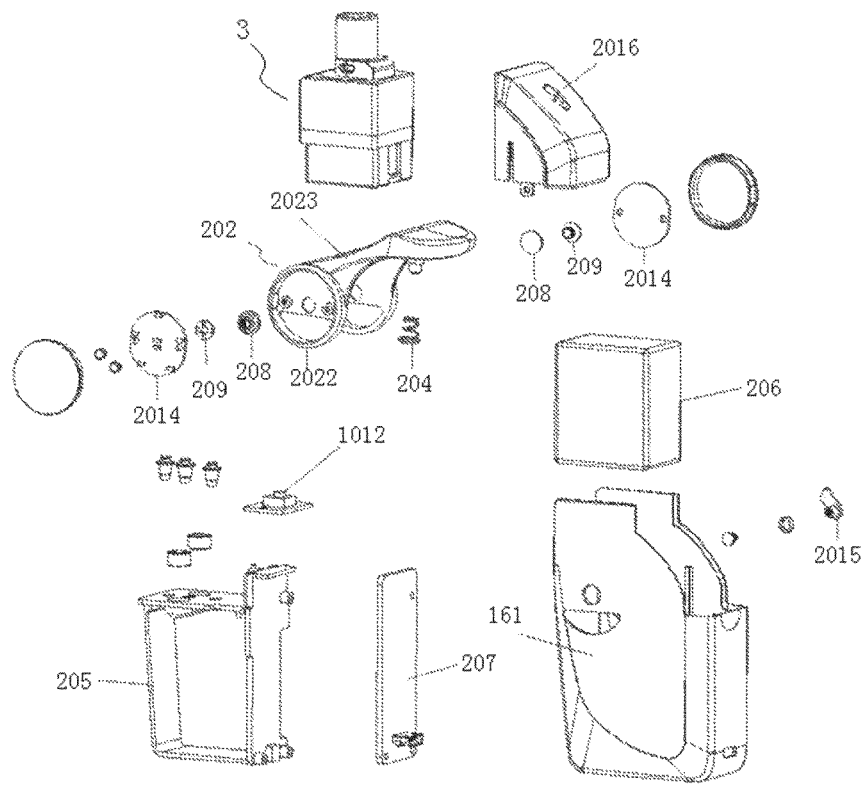
FIG. 6 is an exploded view of the electronic cigarette in Embodiment 1.

As shown in FIGS. 1 to 2, an atomizer includes an atomizer body, and the atomizer body includes a shell 1, a suction nozzle assembly 3 mounted at the top of the shell 1, a liquid chamber 4 and an atomization core that are arranged in the shell 1, and a connecting electrode 6 mounted at the bottom of the shell 1.

The atomization core includes an atomization sheet 5. The atomization sheet 5 is electrically connected to the connecting electrode 6. An atomization cotton 7 capable of importing cigarette liquid from the liquid chamber 4 into the atomization sheet 5 is arranged in the shell 1. An air inlet channel and an air outlet channel are disposed in the shell 1, one end of the air inlet channel is communicated with the outside and the other end is communicated with an atomization surface of the atomization sheet 5, one end of the air outlet channel is communicated with the atomization surface of the atomization sheet 5 and the other end is communicated with the suction nozzle assembly 3.

The suction nozzle assembly 3 includes a suction nozzle holder 31 for sealing the top of the shell 1, and a nozzle 32 fixedly connected to the suction nozzle holder 31. An opening and closing device capable of controlling the cigarette liquid flow into the atomization cotton 7 and the air flow into the air inlet channel simultaneously is arranged at a connection between the liquid chamber 4 and the atomization cotton 7. The opening and closing device includes a hollow connecting sleeve 2 fixedly connected to the suction nozzle holder 31. The air inlet channel includes first air inlets 21 provided on the connecting sleeve 2. The suction nozzle holder 31 is provided with air inlets 311 as high as the first air inlets 21, and the air inlets 311 are aligned and communicated with the first air inlets 21. A receiving cavity with an open bottom end is disposed at the lower part of the connecting sleeve 2.

The suction nozzle holder 31 is provided with a first liquid injection hole 312. The top of the shell 1 is provided with a second liquid injection hole 313. The second liquid injection hole 313 is communicated with the liquid chamber 4.

A sealing gasket 14 is arranged between the lower surface of the suction nozzle holder 31 and the top of the shell 1. A one-way valve 15 that can be opened towards the liquid chamber 4 is arranged at a position corresponding to the second liquid injection hole 313 on the sealing gasket 14.

The atomization core further includes a hollow liquid separation holder 10 arranged at the bottom of the liquid chamber 4 for sealing the liquid chamber 4. The atomization sheet 5 is arranged in a lower cavity of the liquid separation holder 10. An inner sleeve 11 is arranged at the upper part of the hollow cavity of the liquid separation holder 10. The atomization cotton 7 is arranged between the outer wall of the inner sleeve 11 and the inner wall of the liquid separation holder 10. The atomization cotton abuts against the atomization surface of the atomization sheet 5.

A hollow air inlet tube 12 is disposed in the inner cavity of the connecting sleeve 2. The air inlet tube 12 is provided with second air inlets 121 as high as the first air inlets 21. The lower end of the air inlet tube 12 is fixedly connected to the inner sleeve 11. Air in the air inlet tube 12 can be introduced to the atomization surface of the atomization sheet 5.

The upper part of the liquid separation holder 10 is sleeved in a receiving cavity of the connecting sleeve 2, and the connecting sleeve 2 is rotatable relative to the outer wall of the liquid separation holder 10. The connecting sleeve 2 is provided with first liquid inlets 22 corresponding to the bottom of the liquid chamber 4. The upper part of the liquid separation holder 10 is provided with second liquid inlets 101 as high as the first liquid inlets 22. The side wall of the atomization cotton 7 is closely attached to the second liquid inlets 101 area.

A plurality of first air inlets 21 and first liquid inlets 22 are uniformly distributed up-down one-to-one correspondence about the connecting sleeve 2. The connecting lines between the first air inlets 21 and the corresponding first liquid inlets 22 are parallel to the axis of the connecting sleeve 2.

The connection or disconnection state between the first air inlets 21 and the second air inlets 121 is synchronous with the connection or disconnection state between the first liquid inlets 22 and the second liquid inlets 101.

The air outlet channel is communicated with the nozzle 32.

The atomization cotton 7 is of a hollow cylindrical structure.

The air outlet channel includes an air outlet tube 13 sleeved in the inner cavity of the air inlet tube 12. The lower end of the air outlet tube 13 is extended into the hollow cavity of the atomization cotton 7, the upper end of the air outlet tube 13 is extended to and connected to the inner cavity of the nozzle 32. A first gap is reserved between the inner wall of the air inlet tube 12 and the outer wall of the air outlet tube 13, and the first gap is communicated with the second air inlets 121 to form a first air inlet channel 9.

The lower end of the inner sleeve 11 is provided with an open air guiding cavity, the open air guiding cavity is communicated with the hollow cavity of the atomization cotton 7, and the first air inlet channel 9 is communicated with the air guiding cavity. The lower part of the air guiding cavity of the inner sleeve 11 is sleeved with a first spring 8. The lower end of the first spring 8 abuts against the inner surface of the bottom of the atomization cotton 7. The air outlet tube 13 penetrates through the inner sleeve 11 and inserts into a center hole of the first spring 8.

By rotating the suction nozzle holder 31 to drive the connecting sleeve 2 to rotate, the first air inlets 21 on the connecting sleeve 2 rotate about the fixed air inlet tube 12, and when the first air inlets 21 are aligned and communicated with the second air inlets 121, air is introduced. The outside air sequentially enters the first air inlets 21, the second air inlets 121, the first air inlet channel 9, and the air guiding cavity from the air inlets 311, and finally reaches the bottom of the hollow cavity of the atomization cotton 7. At the same time, the first liquid inlets 22 on the connecting sleeve 2 rotate about the fixed liquid separation holder 10, and when the first liquid inlets 22 are aligned and communicated with the second liquid inlets 101, the cigarette liquid in the liquid chamber 4 is sequentially imported into the atomization cotton 7 from the first liquid inlets 22 and the second liquid inlets 101. When the first air inlets 21 are aligned and communicated with the second air inlets 121, the first liquid inlets 22 are also aligned and communicated with the second liquid inlets 101. When the first air inlets 21 are disconnected from the second air inlets 121, the first liquid inlets 22 are also disconnected from the second liquid inlets 101. The atomized smoke reaches the nozzle 32 from the air outlet tube 13.

Through this design, the electronic cigarette can be sucked by rotation, and when the electronic cigarette is not sucked, the air and liquid inlet channels are closed, thereby preventing juveniles from smoking on the one hand, and preventing the atomization cotton 7 and the atomization sheet 5 from accumulating liquid due to long-time static placement on the other hand.

As shown in FIG. 3 to FIG. 6, this embodiment further provides an electronic cigarette, including a power module 16 and the above-mentioned atomizer.

The power module 16 includes a housing 161 and a touch switch 2012 that controls on/off of a circuit.

The power module 16 is electrically connected to the connecting electrode 6 of the atomizer, and the housing 161 is clamped to the shell 1 through a connecting structure. The connecting structure includes a first bulge 17 on the side wall of the shell 1, an elastic jaw 162 on the housing 161, magnets 163 arranged on the housing 161, and a magnetizable metal sheet 164 arranged at the bottom of the shell 1. The magnets 163 are closely attached to the metal sheet 164, and the first bulge 17 is engaged with the elastic jaw 162 to fix the atomizer with the power module 16 relatively.

A rotatable key 202 is arranged on the side of the housing 161, and its rotating shaft 2021 is perpendicular to the housing 161.

The key 202 includes a rotating shaft portion 2022 and a pressing portion 2023 connected to the rotating shaft portion 2022. The pressing portion 2023 and the rotating shaft portion 2022 cross two sides of the housing 161. The key 202 is provided with a notch at one end close to the rotating shaft portion 2022. The atomizer and the top of the housing 161 can pass through the notch.

An internal threaded sleeve 208 and an external threaded sleeve 209 connect the rotating shaft portion 2022 with the housing 161, the internal threaded sleeve 208 and the external threaded sleeve 209 form the rotating shaft 2021 of the rotating shaft portion 2022 after assembled.

The pressing portion 2023 can be engaged with or disengaged from the touch switch 2012 by rotation of the rotating shaft portion 2022.

A battery holder 205 is arranged in the housing 161. A battery 206 is mounted in the battery holder 205. A main circuit board 207 is mounted on one side of the battery holder 205. The touch switch 2012 is arranged at the top of the battery holder 205, and the touch switch 2012 is electrically connected to the main circuit board 207.

The lower surface of the pressing portion 2023 is provided with a second bulge 203 for pressing the touch switch 2012. The housing 161 is provided with a kidney-shaped spacing hole 2016 facing the pressing portion 2023. The second bulge 203 of the pressing portion 2023 stretches into the spacing hole 2016. The length of the spacing hole 2016 is longer than the travel range of the pressing portion 2023. The second bulge 203 is located above the touch switch 2012.

A second spring 204 is arranged between the pressing portion 2023 and the touch switch 2012. One end of the second spring 204 is fixedly sleeved with the second bulge 203 of the pressing portion 2023, and the other end is fixedly connected to a housing of the touch switch 2012.

A rotatable ejector rod 2015 is arranged on the housing 161 and below the pressing portion 2023. The rotating shaft of the ejector rod 2015 is parallel to the rotating shaft 2021 of the rotating shaft portion 2022. The ejector rod 2015 can be engaged with or disengaged from the pressing portion 2023.

When in use, rotate the ejector rod 2015 and disengage it from the pressing portion 2023, then press the pressing portion 2023 down, so the second bulge 203 is brought into contact with the touch switch 2012, and the electronic cigarette operates. If the pressing is continued, the spacing hole 2016 will limits the pressing portion 2023 to continuously rotate down for protection. When not in use, release the pressing portion 2023, and under the effect of the second spring 204, the pressing portion 2023 bounces off the touch switch 2012, and the electronic cigarette stops operating. Rotate the ejector rod 2015 to bear against the pressing portion 2023, which can effectively avoid misoperations caused by unintentional pressing of the pressing portion 2023 when the electronic cigarette is packaged or transported or not used.

Embodiment 2

Figure 7:
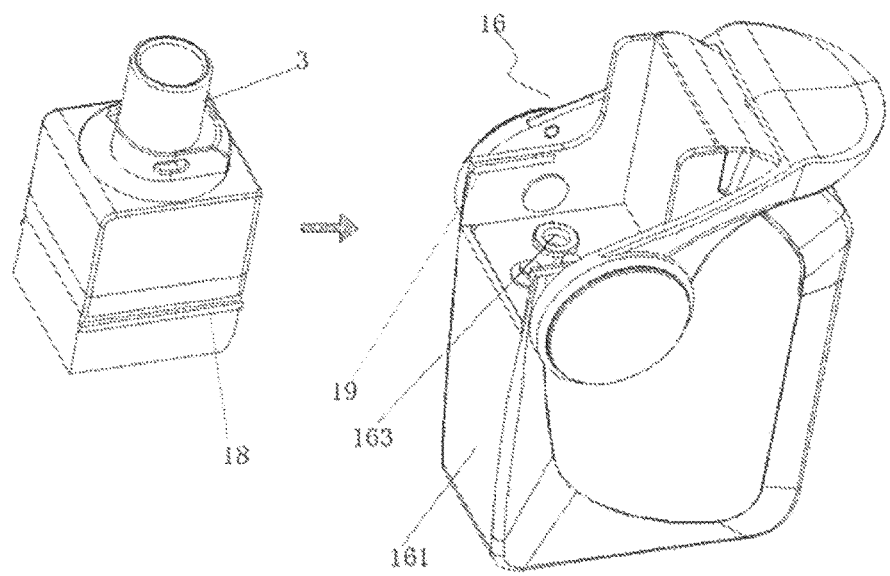
FIG. 7 is a structural exploded view of an electronic cigarette in Embodiment 2.

As shown in FIG. 7, as same as the Embodiment 1, except that the connecting structure is in a different form. The connecting structure of this embodiment includes a strip slider 18 on the side wall of the shell 1, chutes 19 on the housing 161, a magnet 163 arranged on the housing 161, and a magnetizable metal sheet 164 arranged at the bottom of the shell 1.

The slider 18 is inserted into the chutes 19 for clamping, and the magnet 163 is closely attached to the metal sheet 164 to fix the atomizer with the power module 16 relatively.

Embodiment 3

Figure 8:
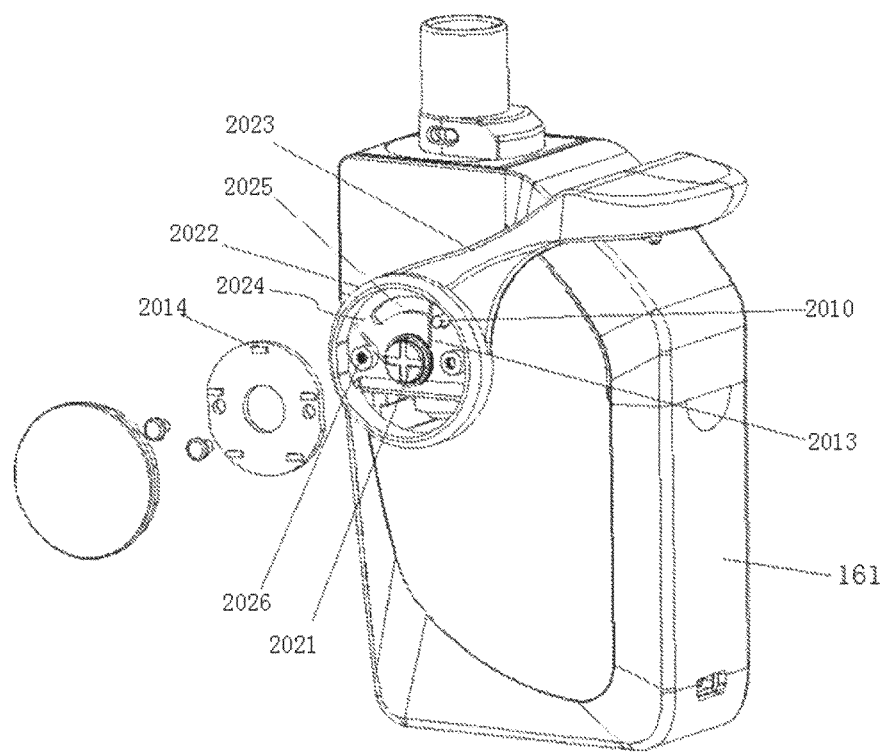
FIG. 8 is a structural view of an electronic cigarette in Embodiment 3.

As shown in FIG. 8, as same as the Embodiment 1, except that the spring 4 between the pressing portion 2023 and the touch switch 2012 is removed.

The rotating shaft portion 2022 is provided with a receiving cavity 2024. An internal threaded sleeve 208 and an external threaded sleeve 209 are arranged as a rotating shaft 2021 in the center of the receiving cavity 2024. The internal threaded sleeve 208 and the external threaded sleeve 209 connect the rotating shaft portion 2022 with the housing 161, and the internal threaded sleeve 208 and the external threaded sleeve 209 form the rotating shaft 2021 of the rotating shaft portion 2022 after assembled.

The receiving cavity 2024 is provided with an arc groove 2025 on a side wall close to the housing 161. A positioning pin 2010 is arranged on the housing 161. The positioning pin 2010 penetrates through the arc groove 2025.

A stop pin 2026 is arranged in the receiving cavity 2024. A torsion spring 2013 is sleeved at the rotating shaft 2021. A torsion arm of the torsion spring 2013 is clamped between the stop pin 2026 and the positioning pin 2010.

A switch base 2014 is fixed in the receiving cavity 2024. The switch base 2014 moves synchronously with the rotating shaft portion 2022. The touch switch 2012 is arranged on a side of the switch base 2014 facing the housing 161, and the touch switch 2012 is arranged to face the arc groove 2025. The positioning pin 2010 can be engaged with or disengaged from the touch switch 2012.

The touch switch 2012 is electrically connected to the main circuit board 207. When in use, rotate the ejector rod 2015 and disengaged it from the pressing portion 2023, then press the pressing portion 2023 down, so the switch base 2014 rotates synchronously with the rotating shaft portion 2022, the touch switch 2012 abuts against the positioning pin 2010 during the rotation to turn on the circuit, so that the electronic cigarette operates. When release the pressing portion 2023, the rotating shaft portion 2022 is reversely rotated under the effect of the torsion spring 2013, the positioning pin 2010 is disengaged from the touch switch 2012, the circuit is cut off, and the electronic cigarette stops operating.

The invention claimed is:

1. An atomizer, comprising an atomizer body, wherein the atomizer body comprises a shell (1), a suction nozzle assembly (3) mounted at the top of the shell (1), a liquid chamber (4) and an atomization core are disposed in the shell (1);
    wherein the atomization core comprises an atomization sheet (5), and wherein an atomization cotton (7) capable of importing cigarette liquid from the liquid chamber (4) into the atomization sheet (5) is disposed in the shell (1); wherein the inner of the shell (1) is provided with an air inlet channel whose one end is communicated with the outside and the other end is communicated with an atomization surface of the atomization sheet (5), and an air outlet whose one end is communicated with the atomization surface of the atomization sheet (5) and the other end is communicated with the suction nozzle assembly (3); wherein an opening and closing device capable of controlling the cigarette liquid to flow into the atomization cotton (7) and the air to flow into the air inlet channel simultaneously is disposed at a connection position between the liquid chamber (4) and the atomization cotton (7).

2. The atomizer according to claim 1, wherein the suction nozzle assembly (3) comprises a suction nozzle holder (31) for sealing the top of the shell (1), and a nozzle (32) fixedly connected to the suction nozzle holder (31);
    wherein the atomizer body further comprises a connecting electrode (6) mounted at the bottom of the shell (1), and the atomization sheet (5) is electrically connected to the connecting electrode (6).

3. The atomizer according to claim 2, wherein the opening and closing device comprises a hollow connecting sleeve (2) fixedly connected to the suction nozzle holder (31), the air inlet channel comprises first air inlets (21) disposed on the connecting sleeve (2), the suction nozzle holder (31) is provided with air inlets (311) as high as the first air inlets (21), the air inlets (311) are aligned with and communicated with the first air inlets (21), and a receiving cavity with an open bottom end is disposed at the lower part of the connecting sleeve (2);
- wherein the atomization core further comprises a hollow liquid separation holder (10) arranged at the bottom of the liquid chamber (4) for sealing the liquid chamber (4), the atomization sheet (5) is arranged in a lower cavity of the liquid separation holder (10), an inner sleeve (11) is arranged at the upper part of the hollow cavity of the liquid separation holder (10), the atomization cotton (7) is arranged between the outer wall of the inner sleeve (11) and the inner wall of the liquid separation holder (10), and the atomization cotton abuts against the atomization surface of the atomization sheet (5);
- wherein a hollow air inlet tube (12) is disposed in the inner cavity of the connecting sleeve (2), the air inlet tube (12) is provided with second air inlets (121) as high as the first air inlets (21), the lower end of the air inlet tube (12) is fixedly connected to the inner sleeve (11), and air in the air inlet tube (12) can be introduced to the atomization surface of the atomization sheet (5);
- wherein the upper part of the liquid separation holder (10) is sleeved in a receiving cavity of the connecting sleeve (2), and the connecting sleeve (2) is rotatable relative to the outer wall of the liquid separation holder (10);
- wherein the connecting sleeve (2) is provided with first liquid inlets (22) corresponding to the bottom of the liquid chamber (4), the upper part of the liquid separation holder (10) is provided with second liquid inlets (101) as high as the first liquid inlets (22), and the side wall of the atomization cotton (7) is closely attached to the second liquid inlets (101) area;
- wherein the connection or disconnection state between the first air inlets (21) and the second air inlets (121) is synchronous with the connection or disconnection state between the first liquid inlets (22) and the second liquid inlets (101);
- wherein the air outlet channel is communicated with the nozzle (32).

4. The atomizer according to claim 3, wherein the atomization cotton (7) is of a hollow cylindrical structure, the air outlet channel comprises an air outlet tube (13) sleeved in the inner cavity of the air inlet tube (12), the lower end of the air outlet tube (13) is extended into the hollow cavity of the atomization cotton (7), and the upper end of the air outlet tube (13) is extended to and connected to the inner cavity of the nozzle (32); wherein a first gap is reserved between the inner wall of the air inlet tube (12) and the outer wall of the air outlet tube (13), and the first gap is communicated with the second air inlets (121), which forms a first air inlet channel (9);
- wherein the lower end of the inner sleeve (11) is provided with an open air guiding cavity which communicates with the hollow cavity of the atomization cotton (7), and the first air inlet channel (9) is communicated with the air guiding cavity.

5. The atomizer according to claim 4, wherein the lower part of the air guiding cavity of the inner sleeve (11) is sleeved with a first spring (8), the lower end of the first spring (8) abuts against the inner surface of the bottom of the atomization cotton (7), and the air outlet tube (13) penetrates through the inner sleeve (11) and inserts into a center hole of the first spring (8).

6. The atomizer according to claim 3, wherein the suction nozzle holder (31) is provided with a first liquid injection hole (312), the top of the shell (1) is provided with a second liquid injection hole (313), and the second liquid injection hole (313) is communicated with the liquid chamber (4);
- wherein a sealing gasket (14) is arranged between the lower surface of the suction nozzle holder (31) and the top of the shell (1), and a one-way valve (15) that can be opened towards the liquid chamber (4) is arranged at a position corresponding to the second liquid injection hole (313) on the sealing gasket (14).

7. The atomizer according to claim 6, wherein a plurality of first air inlets (21) and first liquid inlets (22) are uniformly distributed up-down and one-to- one correspondence about the connecting sleeve (2), and the connecting lines between the first air inlets (21) and the corresponding first liquid inlets (22) are parallel to the axis of the connecting sleeve (2).

8. An electronic cigarette comprising a power module (16), the power module (16) comprising a housing (161), wherein the electronic cigarette further comprises an atomizer, the atomizer comprising an atomizer body, the atomizer body comprises a shell (1), a suction nozzle assembly (3) mounted at the top of the shell (1), a liquid chamber (4) and an atomization core are disposed in the shell (1);
- wherein the atomization core comprises an atomization sheet (5), and wherein an atomization cotton (7) capable of importing cigarette liquid from the liquid chamber (4) into the atomization sheet (5) is disposed in the shell (1); wherein the inner of the shell (1) is provided with an air inlet channel whose one end is communicated with the outside and the other end is communicated with an atomization surface of the atomization sheet (5), and an air outlet whose one end is communicated with the atomization surface of the atomization sheet (5) and the other end is communicated with the suction nozzle assembly (3); wherein an opening and closing device capable of controlling the cigarette liquid to flow into the atomization cotton (7) and the air to flow into the air inlet channel simultaneously is disposed at a connection position between the liquid chamber (4) and the atomization cotton (7);
- wherein the power module (16) is electrically connected to the connecting electrode (6) of the atomizer, and the housing (161) is clamped to the shell (1) through a connecting structure.

9. The electronic cigarette according to claim 8, wherein the suction nozzle assembly (3) comprises a suction nozzle holder (31) for sealing the top of the shell (1), and a nozzle (32) fixedly connected to the suction nozzle holder (31);
- wherein the atomizer body further comprises a connecting electrode (6) mounted at the bottom of the shell (1), and the atomization sheet (5) is electrically connected to the connecting electrode (6);
- wherein the opening and closing device comprises a hollow connecting sleeve (2) fixedly connected to the suction nozzle holder (31), the air inlet channel comprises first air inlets (21) disposed on the connecting sleeve (2), the suction nozzle holder (31) is provided with air inlets (311) as high as the first air inlets (21), the air inlets (311) are aligned with and communicated with the first air inlets (21), and a receiving cavity with an open bottom end is disposed at the lower part of the connecting sleeve (2);
- wherein the atomization core further comprises a hollow liquid separation holder (10) arranged at the bottom of the liquid chamber (4) for sealing the liquid chamber (4), the atomization sheet (5) is arranged in a lower cavity of the liquid separation holder (10), an inner sleeve (11) is arranged at the upper part of the hollow cavity of the liquid separation holder (10), the atomization cotton (7) is arranged between the outer wall of the inner sleeve (11) and the inner wall of the liquid separation holder (10), and the atomization cotton abuts against the atomization surface of the atomization sheet (5);

wherein a hollow air inlet tube (12) is disposed in the inner cavity of the connecting sleeve (2), the air inlet tube (12) is provided with second air inlets (121) as high as the first air inlets (21), the lower end of the air inlet tube (12) is fixedly connected to the inner sleeve (11), and air in the air inlet tube (12) can be introduced to the atomization surface of the atomization sheet (5);

wherein the upper part of the liquid separation holder (10) is sleeved in a receiving cavity of the connecting sleeve (2), and the connecting sleeve (2) is rotatable relative to the outer wall of the liquid separation holder (10); wherein the connecting sleeve (2) is provided with first liquid inlets (22) corresponding to the bottom of the liquid chamber (4), the upper part of the liquid separation holder (10) is provided with second liquid inlets (101) as high as the first liquid inlets (22), and the side wall of the atomization cotton (7) is closely attached to the second liquid inlets (101) area;

wherein the connection or disconnection state between the first air inlets (21) and the second air inlets (121) is synchronous with the connection or disconnection state between the first liquid inlets (22) and the second liquid inlets (101);

wherein the air outlet channel is communicated with the nozzle (32).

10. The electronic cigarette according to claim 8, wherein the connecting structure comprises a first bulge (17) on the side wall of the shell (1), an elastic jaw (162) on the housing (161), magnets (163) arranged on the housing (161), and a magnetizable metal sheet (164) arranged at the bottom of the shell (1);

wherein the magnets (163) are closely attached to the metal sheet (164), and the first bulge (17) is engaged with the elastic jaw (162) to fix the atomizer with the power module (16) relatively.

11. The electronic cigarette according to claim 8, wherein the connecting structure comprises a strip slider (18) on the side wall of the shell (1), chutes (19) on the housing (161), a magnet (163) arranged on the housing (161), and a magnetizable metal sheet (164) arranged at the bottom of the shell (1);

wherein the slider (18) is inserted into the chutes (19) for clamping, and the magnet (163) is closely attached to the metal sheet (164) to fix the atomizer with the power module (16) relatively.

12. The electronic cigarette according to claim 8, further comprising a touch switch (2012) that controls on/off of a circuit;

wherein a rotatable key (202) is arranged on the side of the housing (161), and its rotating shaft (2021) is perpendicular to the housing (161); wherein the key (202) comprises a rotating shaft portion (2022) and a pressing portion (2023) connected to the rotating shaft portion (2022), and the pressing portion (2023) can be engaged with or disengaged from the touch switch (2012) by rotation of the rotating shaft portion (2022).

13. The electronic cigarette according to claim 12, wherein the lower surface of the pressing portion (2023) is provided with a second bulge (203) for pressing the touch switch (2012), and the second bulge (203) is located above the touch switch (2012);

wherein a second spring (204) is arranged between the pressing portion (2023) and the touch switch (2012), one end of the second spring (204) is fixedly sleeved with the second bulge (203) of the pressing portion (2023), and the other end is fixedly connected to a housing of the touch switch (2012).

14. The electronic cigarette according to claim 13, wherein a battery holder (205) is arranged in the housing (161), a battery (206) is mounted in the battery holder (205), a main circuit board (207) is mounted on one side of the battery holder (205), the touch switch (2012) is arranged at the top of the battery holder (205), and the touch switch (2012) is electrically connected to the main circuit board (207).

15. The electronic cigarette according to claim 12, wherein the housing (161) is provided with a kidney-shaped spacing hole (2016) facing the pressing portion (2023), the second bulge (203) of the pressing portion (2023) stretches into the spacing hole (2016), and the length of the spacing hole (2016) is longer than the travel range of the pressing portion (2023).

16. The electronic cigarette according to claim 12, wherein the rotating shaft portion (2022) is provided with a receiving cavity (2024), an internal threaded sleeve (208) and an external threaded sleeve (209) are arranged as a rotating shaft (2021) in the center of the receiving cavity (2024), the internal threaded sleeve (208) and the external threaded sleeve (209) connect the rotating shaft portion (2022) with the housing (161), the internal threaded sleeve (208) and the external threaded sleeve (209) form the rotating shaft (2021) of the rotating shaft portion (2022) after assembled;

wherein the receiving cavity (2024) is provided with an arc groove (2025) on a side wall close to the housing (161), a positioning pin (2010) is arranged on the housing (161), and the positioning pin (2010) penetrates through the arc groove (2025);

wherein a stop pin (2026) is arranged in the receiving cavity (2024), a torsion spring (2013) is sleeved at the rotating shaft (2021), and a torsion arm of the torsion spring (2013) is clamped between the stop pin (2026) and the positioning pin (2010).

17. The electronic cigarette according to claim 16, wherein a battery holder (205) is arranged in the housing (161), a battery (206) is mounted in the battery holder (205), and a main circuit board (207) is mounted on one side of the battery holder (205);

wherein a switch base (2014) is fixed in the receiving cavity (2024), the switch base (2014) moves synchronously with the rotating shaft portion (2022), the touch switch (2012) is arranged on a side of the switch base (2014) facing the housing (161), the touch switch (2012) is arranged to face the arc groove (2025), and the positioning pin (2010) can be engaged with or disengaged from the touch switch (2012);

wherein the touch switch (2012) is electrically connected to the main circuit board (207).

18. The electronic cigarette according to claim 12, wherein the pressing portion (2023) and the rotating shaft portion (2022) cross two sides of the housing (161), the key (202) is provided with a notch at one end close to the rotating shaft portion (2022), and the atomizer and the top of the housing (161) can pass through the notch.

19. The electronic cigarette according to claim 16, wherein the pressing portion (2023) and the rotating shaft portion (2022) cross two sides of the housing (161), the key (202) is provided with a notch at one end close to the rotating shaft portion (2022), and the atomizer and the top of the housing (161) can pass through the notch.

20. The electronic cigarette according to claim 12, wherein a rotatable ejector rod (2015) is arranged on the housing (161) and below the pressing portion (2023), the rotating shaft of the ejector rod (2015) is parallel to the rotating shaft (21) of the rotating shaft portion (2022), and the ejector rod (2015) can be engaged with or disengaged from the pressing portion (2023).

* * * * *